United States Patent [19]
Pao et al.

[11] Patent Number: 5,817,360
[45] Date of Patent: *Oct. 6, 1998

[54] CITRUS FRUIT PEELING METHOD

[75] Inventors: Shi-Chiang Pao, Winter Haven; Peter D. Petracek, Auburndale; G. Eldon Brown, Winter Haven, all of Fla.

[73] Assignee: Florida Department of Citrus, Lakeland, Fla.

[*] Notice: The term of this patent shall not extend beyond the expiration date of Pat. No. 5,560,951.

[21] Appl. No.: 702,927

[22] Filed: Aug. 26, 1996

Related U.S. Application Data

[63] Continuation-in-part of Ser. No. 396,915, Mar. 1, 1995, Pat. No. 5,560,951.
[51] Int. Cl.⁶ .................................................. A23N 7/00
[52] U.S. Cl. ........................ 426/482; 426/478; 426/479; 426/481; 426/506
[58] Field of Search ................................ 426/308, 506, 426/478, 479, 481, 482

[56] References Cited

U.S. PATENT DOCUMENTS

| | | | |
|---|---|---|---|
| 3,970,762 | 7/1976 | Askienazy et al. | 426/287 |
| 5,196,222 | 3/1993 | Kirk | 426/482 |
| 5,200,217 | 4/1993 | Elliott et al. | 426/50 |
| 5,560,951 | 10/1996 | Pao et al. | 426/482 |

*Primary Examiner*—Lien Tran
*Attorney, Agent, or Firm*—Allen, Dyer, Doppelt, Milbrath & Gilchrist, P.A.

[57] ABSTRACT

A method of pretreating citrus fruit for facilitating peeling utilizes infusion with an aqueous solution for loosening the peel from the underlying segments. In a first embodiment an infusion of water having essentially neither enzyme nor any other additive therein is accomplished with the use of a pressure or a vacuum apparatus. Further embodiments include making a pair of opposed holes in the peel and forcing an aqueous solution that may or may not contain an enzyme or an additive at low pressure into one of the holes until it emerges from the other hole. In one embodiment water pressure from a faucet may be used; in another, a flexible injection nozzle is used as an interface between the solution source and the inlet hole. All embodiments serve to separate the peel from the segments by hydrating the albedo, making the fruit easier to peel.

15 Claims, 9 Drawing Sheets

COMPRESSED AIR

CITRUS FRUIT PEELING METHOD

CROSS-REFERENCE TO RELATED APPLICATIONS

This is a continuation-in-part of application Ser. No. 08/396,915, "Nonenzymatic Fruit Peeling Method," filed Mar. 1, 1995, now U.S. Pat. No. 5,560,951.

BACKGROUND OF THE INVENTION

1. Field of the Invention

The present invention relates to peeling methods and apparatus for fruit, and, more particularly, to apparatus and methods for facilitating the peeling of citrus fruit.

2. Description of Related Art

Consumer demand for fresh cut produce has stimulated a renewed interest in developing citrus peeling methods. Traditional techniques for citrus peeling typically have consisted of hand or mechanical peeling facilitated by steam treatment to loosen the peel and/or chemical digestion to remove peel remnants. However, since these techniques often damage the flesh, an enzymatic peeling process was developed to produce fruit more suitable for the fresh market (Bruemmer, U.S. Pat. No. 4,284,651; Kirk, U.S. Pat. No. 5,196,222; Elliott et al, U.S. Pat. No. 5,200,217). This process of enzymatic peeling comprises scoring or perforating the fruit peel, submerging the fruit into solution containing an enzyme (pectinase and/or pectinase and cellulase), and forcing the solution into the peel with the use of a vacuum. Another method comprises using pressure pulses (Adams and Kirk, U.S. Pat. No. 5,000,967). The enzyme solution partially digests the pectin-rich albedo (the inner part of the peel) and the regions of the intersegment membranes and thus facilitates the separation of fruit from peel and sectioning of the fruit while leaving the flesh nearly intact.

Vacuum and pressure-pulse infusion are usually effective in imbuing the peel with solution. When the fruit surface is not sterilized and thoroughly cleaned, however, microbiological contaminants and chemical residues on the surface may desorb into solution while the fruit is submerged and contact the flesh during infusion. The likelihood of contamination increases if the infusion solution is reused in order to conserve water or enzyme.

Commercially available enzymatically peeled citrus fruit exhibit juice leakage and softening during storage in spite of apparent preservation of the integrity of segment membranes and juice vesicles. Although the quality of these fruit may be extended by low temperature and controlled-atmosphere storage and incorporation of chemicals such as calcium lactate, it was suspected that the observed loss of quality is caused in part by an inadvertent infusion of the enzyme(s) into the fruit and a subsequent catabolism of the flesh throughout the storage period.

A composition for washing and peeling citrus fruit has been disclosed by Askienazy et al. (U.S. Pat. No. 3,970,762) that contains an alkanolamine as the active ingredient in aqueous solution. In this work it is taught that the content of the active substance must be from 0.2 to 20%.

A device for peeling mandarin oranges has been disclosed in a Japanese patent issued to Yamato Seikan Co., Ltd. (Jap. Pat. No. 45-31354). This device comprises an injection nozzle having a serrated knife blade for cutting the peel. Pressurized liquid is injected into the cut portion of the peel into the space between the albedo and the flesh that is characteristic of and peculiar to mandarin oranges.

SUMMARY OF THE INVENTION

It is an object of this invention to provide a method of pretreating citrus fruit for facilitating peeling.

It is an additional object to provide such a method that preserves fruit quality.

It is a further object to provide such a method that maintains the hydration level of the fruit.

It is another object to provide such a method that preserves fruit firmness.

It is yet an additional object to provide such a method that preserves taste quality.

It is yet a further object to provide such a method that preserves fruit appearance.

It is yet another object to provide such a method that produces fruit having a longer shelf life.

It is another object to provide an in-home method of pretreating fruit for peeling that is simple to implement and preserves fruit quality.

It is an additional method to provide a commercially viable method of pretreating fruit for peeling that preserves fruit quality.

It is a further object to provide a simple and effective method for citrus peel infusion that minimizes solution usage and solution contact with the outer peel surface.

It is yet another object to provide an apparatus effective in infusing a citrus fruit with a solution for facilitating peeling.

The method and apparatus for pretreating a citrus fruit for facilitating peeling of the present invention satisfy these and other objectives.

Citrus fruit in general comprises an inner body comprising a plurality of radial adjacent fruit segments surrounded by a peel that consists of a flavedo (outer, colored peel portion) and an albedo (inner, white peel portion). Different varieties of citrus are more or less difficult to peel, and have more or less albedo, which must be removed for effective peeling. The method presented herein addresses both of these problems by providing a technique for preparing citrus fruit for peeling. Although not intended to be limiting, the method may be used on a variety of citrus fruit, including grapefruit, oranges, and tangelos.

Broadly, the method comprises the steps of forming plural opposed openings in the peel and infusing an aqueous solution between the cuticle and the fruit segments through the opposed openings. A pressure differential is applied to the infusing water relative to the pressure exterior of the fruit sufficient to radially expand the peel and to separate the peel from the body of the fruit.

In a first embodiment of the method, which is contemplated for use in mass production, the method comprises the steps of scoring the fruit to break the cuticle and infusing the fruit with the aqueous solution. The aqueous solution in this embodiment comprises water that is free of any enzymes or other active ingredients in sufficient amounts to chemically attack or react with the cuticle, albedo, or fruit segments, which can cause the above-listed disadvantages in the resultant peeled fruit.

A second and a third embodiment of the method, which are contemplated for use in the home or on individual fruit, for example, on an assembly line, comprise the steps of making a first hole and a second hole or cut in the cuticle of the fruit and infusing the fruit at a low positive pressure through the first hole, the infusing solution exiting from the second hole after having passed between the cuticle and the fruit segments. The infusing solution in these embodiments comprises an aqueous solution that may or may not contain an enzyme or other chemical additive.

Both the second and third embodiments are effective in pretreating citrus fruit of any variety and are particularly useful with non-slip-skin fruits (Mandarin oranges, for example, are a slip-skin fruit), as those with a non-slip skin are more difficult to peel. Among the non-slip-skin fruits are oranges, grapefruits, limes, lemons, uglifruits, Temple oranges, and tangelos, although this listing is not intended as a limitation.

In the second embodiment, a tube is applied to the first hole, the tube having a radius dimensioned to closely engage the first hole. Finally, the fruit is infused with a solution from the tube at a sufficient pressure that the solution exits from the second hole or cut. It has been found that sufficient pressure may be obtained from a conventional water faucet to accomplish the desired pretreatment. In a particular embodiment the solution comprises water having essentially no enzyme or other chemical additive therein, although alternate embodiments may be contemplated wherein additives are present.

In the third embodiment, the infusion is accomplished with the use of a flexible self-sealing nozzle. The nozzle has an orifice that is connected to a source of infusion solution via tubing. The interface between the nozzle and the tubing is accomplished with a rigid connector dimensioned to permit ends of the nozzle and the tubing to fit in closely surrounding relation thereto. Solution under pressure is then forced through the tubing, through the connector, through the nozzle, and out the orifice into the albedo area of the fruit. The pressurized fluid then is forced between the cuticle and the fruit segments, hydrating the albedo, and exiting from the second hole in the cuticle. The albedo hydration causes the peel to separate from the fruit segments, facilitating peeling.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–11. A schematic diagram of a citrus fruit, illustrating the pertinent parts, is given in FIG. 1. Shown are the peel 15, having a cuticle 10 and an albedo 20, segments 30, blossom end 40, and stem end 50 of the fruit 60. Specific citrus fruit used in the studies to be described herein include white "Marsh" and "Ruby Red" grapefruit, "Hamlin," "Pineapple," and "Valencia" oranges, and "Orlando" tangelos, but no limitation is to be implied by the use of these varieties. The fruit used in the studies were obtained prior to washing and waxing, but were washed on the peeling date. The fruit surfaces were not sterilized.

Embodiment One

Figure 1:
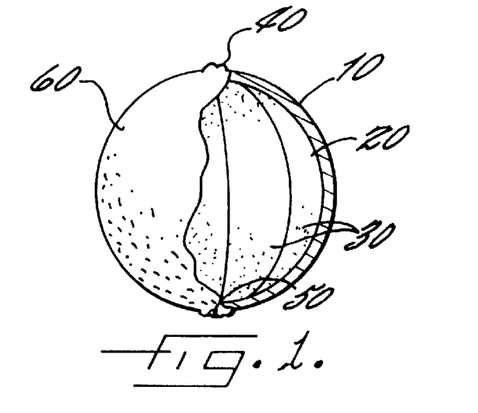
FIG. 1 is a schematic illustration of the parts of a citrus fruit.
Figure 2A:
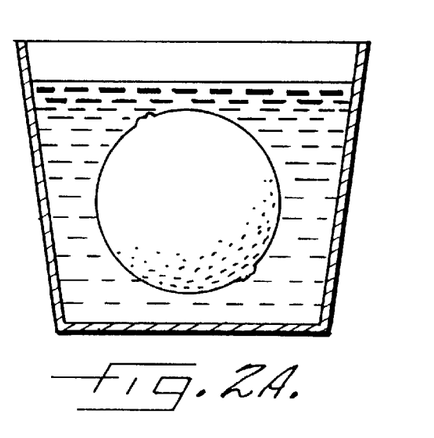
FIGS. 2A, 2B, 2C, 2D illustrate the steps in pretreating a citrus fruit using a vacuum method: (A) holding the fruit at a predetermined temperature in water; (B) scoring the fruit; (C) placing the fruit in water under a vacuum; (D) releasing the vacuum.
Figure 2B:
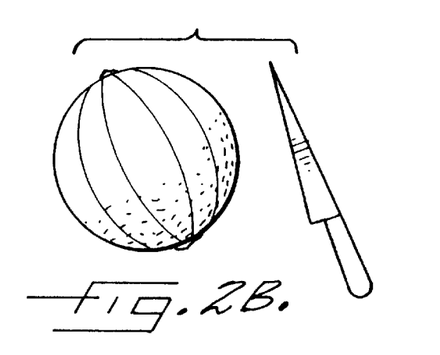
Figures 2C, 2D:
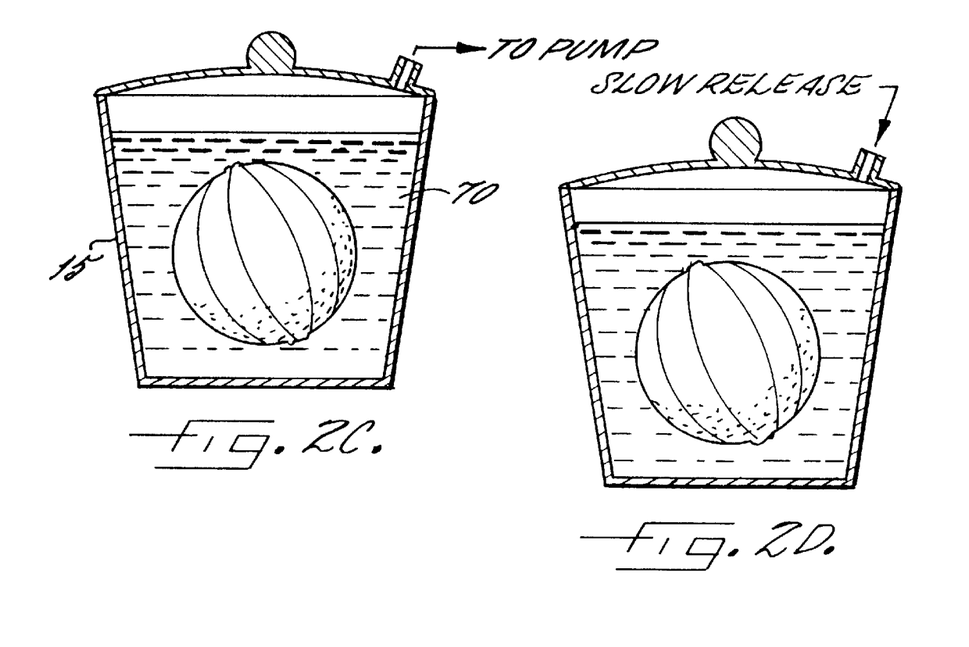
Figure 3A:
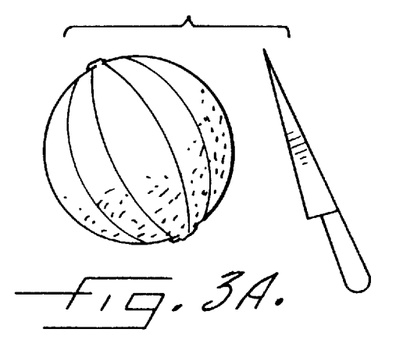
FIGS. 3A, 3B illustrate the steps in pretreating a citrus fruit using a high-pressure method: (A) scoring the fruit; (B) placing the fruit in water under pressure.
Figure 3B:
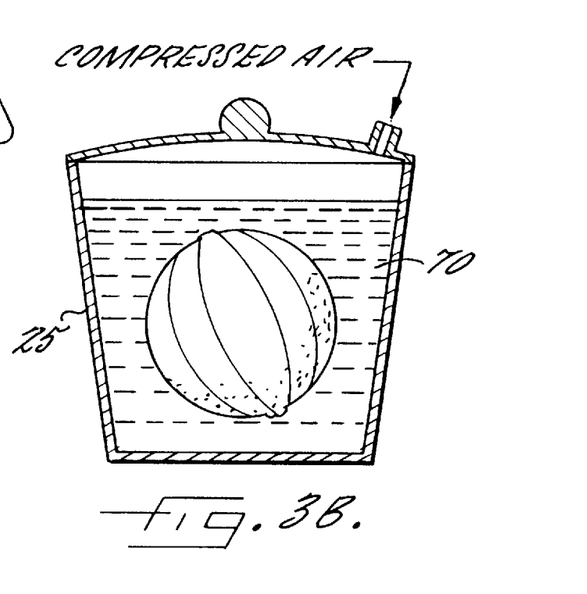

A preferred embodiment of the method of the present invention for pretreating a citrus fruit, as illustrated in FIGS. 2 and 3, for facilitating peeling generally comprises the steps of scoring the fruit 60 to break the cuticle 10 and infusing the fruit with a solution 70 comprising water having essentially no enzyme nor any other active ingredient therein in sufficient amounts to chemically attack or react with the peel. The solution utilized in the studies to be discussed herein consists essentially of only water.

A first step preferably comprises holding the fruit 60 in water 72 at a predetermined treatment temperature for approximately 30 minutes before scoring and infusion (FIG. 2A), and further adjusting the infusion water 70 to the predetermined treatment temperature. The treatment temperature is a variable in the studies, and will be discussed further below.

Studies of a variety of scoring patterns were undertaken, with the result that the most consistent results were obtained by making a plurality of radial cuts from the stem end 50 to the blossom end 40, the plurality of radial cuts preferably comprising six radial cuts 75 (see FIGS. 2B and 3A).

Comparative tests were undertaken using the above-cited enzymatic methods and the method of the present invention.

In the tables and figures, "Enzyme 1" refers to pectinase Spark-L HPG; "Enzyme 2," to pectinase Clarex-L (both from Solvey Enzymes, Inc., Elkhart, Ind.). The enzyme solutions were prepared with distilled and deionized water to, respectively, 500 and 1000 ppm, as recommended in the literature. The solutions were poured into the desired chambers, and 5–10 scored fruit were weighted down in the solution to ensure complete coverage.

Vacuum Infusion. In the vacuum infusion method (FIGS. 2C and 2D), the chamber comprises a 5-L desiccator 15, which is preferably pumped down to approximately 2–4 kPa for approximately 2–5 minutes. In a more preferred embodiment, the desiccator 15 is pumped down to approximately 3 kPa for approximately 3 minutes. The pump was then turned off, and the vacuum was slowly released over a period of approximately 2–5 minutes, or, in a more preferred embodiment, over approximately 3 minutes.

Pressure Infusion. In the pressure infusion method (FIGS. 3A and 3B), the chamber comprises a 10-L pressure cooker 25, which is preferably filled with compressed air to a high pressure in a range of approximately 190–220 kPa. In a more preferred embodiment, the pressure is elevated to approximately 203 kPa. The fruit is subjected to this high pressure for a plurality of predetermined time periods, comprising approximately 10 consecutive periods of approximately 15 seconds each.

In both the vacuum and pressure methods, fruit infused with enzyme were removed from their chambers and incubated for 30 and 60 min, respectively, preferably at the predetermined treatment temperature. It was found that water-infused fruit did not benefit from an incubation period; so these fruit could be peeled immediately following infusion.

Solution-infusion studies have been undertaken on peeling time, juice loss, visual appearance, firmness, microbial stability, and rates of respiration and ethylene emanation. Fruit used in studies on the effects of solution composition on juice loss, visual appearance, firmness, microbial stability, and rates of respiration and ethylene emanation were peeled, rinsed for 10 sec, placed in 0.75-L plastic containers, and held at temperatures of 5°, 10°, or 15° C. Four 1-cm slits were cut into the plastic containers to prevent anaerobic respiration (container gas levels ranged from 16 to 20% $O_2$ and 1.5 to 3% $CO_2$). No additional attempt was made to control or modify the atmosphere in these studies.

Peeling Time Studies. The effects of infusion solution composition, infusion method, and temperature on peeling characteristics have been quantified by determining the time required for four peelers wearing plastic gloves to remove the peel from five fruit each. Peeling was judged to be complete when the peels, albedo, and most loosened fibers were removed from the flesh.

White and red grapefruit infused with enzyme solution had peeling times that were about 10–20% faster than water-infused fruit, as shown in Tables 1 and 2. However, the enzyme treatment did not improve peeling time for oranges and tangelos. For all varieties, the peels of enzyme-treated fruit were noticeably softer than water-treated fruit. For grapefruit, the primary benefit of the enzyme for peeling time, however, was probably that the pectinase digested and promoted the removal of the thick layer of albedo and fiber. This hypothesis is supported by studies on enzyme effects of peeling times in which albedo and fibers were left on the fruit. The removal times for peel only (about 15, 17, 10, and 12 sec/fruit for white and red grapefruit, orange, and tangelo, respectively) were not affected by enzyme treatment (data not shown).

As mentioned, peeling times were not improved for oranges and tangelos by using enzyme infusion. Further studies in which incubation was extended beyond 6 h did not improve the peeling process. Water apparently acts as the primary agent in loosening the peel. Infiltration of the albedo with water hydrates and probably solubilizes the pectin enough to promote sufficient disintegration of the albedo and a general loss of peel integrity, although this theory is not intended to be limiting.

Increasing the temperatures of the fruit and infusion solutions generally improved peeling time for both enzyme- and water-infused fruit (Table 1). Peeling fruit by water infusion at below ambient temperatures was possible, but sometimes hampered by incomplete hydration of the albedo. Tangelos in particular often had dry regions during low-temperature infusion, which slowed peeling and led to damage of the fruit. Temperature effects on enzyme efficacy may be readily explained by enzyme kinetics. Reduced efficacy of water at low temperatures may be related to reduced solubility, a factor that might be improved by incorporation of an adjuvant such as a surfactant.

Peeling times of fruit infusion by pressure and vacuum methods were not significantly different (Table 2). However,

TABLE 1

Effects of enzyme and temperature on peeling time of grapefruit, oranges, and tangeloes.

| | | Peeling time (sec/fruit) | | | |
|---|---|---|---|---|---|
| Infusion solution | Temperature (C.) | White grapefruit | Red grapefruit | Hamlin orange | Orlando tangelo |
| Enzyme 1[a] | 25 | 44 ± 7[b] | 66 ± 9 | 26 ± 4 | 27 ± 5 |
| Enzyme 2 | 25 | 47 ± 6 | 56 ± 4 | 25 ± 2 | 22 ± 2 |
| Enzyme 1 | 45 | 42 ± 2 | 48 ± 3 | 22 ± 2 | 18 ± 2 |
| Enzyme 2 | 45 | 42 ± 8 | 47 ± 4 | 24 ± 2 | 19 ± 1 |
| Water | 5 | 57 ± 4 | 81 ± 10 | 27 ± 3 | 50 ± 12 |
| Water | 15 | 59 ± 3 | 69 ± 7 | 23 ± 4 | 36 ± 6 |
| Water | 25 | 54 ± 6 | 67 ± 7 | 26 ± 5 | 25 ± 4 |
| Water | 35 | 56 ± 2 | 65 ± 4 | 21 ± 4 | 19 ± 3 |
| Water | 45 | 48 ± 5 | 60 ± 3 | 22 ± 3 | 20 ± 1 |

[a]Fruit which were vacuum (3 kPa) infused with Spark-L HPG (enzyme 1) or Clarex-L (enzyme 2) solutions were incubated for 30 min. Fruit which were water infused were peeled immediately after infusion.
[b]Average time for four peeler (±SE).

TABLE 2

Effects of enzyme and infiltration method on peeling time of grapefruit and oranges.

| | | Peeling time (sec/fruit) | |
|---|---|---|---|
| Infusion solution | Infiltration method | White grapefruit | Hamlin orange |
| Enzyme[a] | Vacuum | 41 ± 3[b] | 16 ± 2 |
| Enzyme | Pressure | 48 ± 4 | 17 ± 3 |
| Water | Vacuum | 59 ± 7 | 20 ± 3 |
| Water | Pressure | 53 ± 7 | 20 ± 3 |

[a]Fruit which were vacuum (3 kPa) or pressure (207 kPa) infused with Spark-L HPG enzyme solution were incubated at 25 C. for 1 h or 30 min, respectively. Fruit which were vacuum or pressure fused with water were peeled immediately after infusion.
[b] Average time for four peeler (±SE).

the pressure method often left regions of the albedo unhydrated (about 5–25%).

It has been noted that fruit that were scored, but not infused with solution, could be peeled at rates similar to that of the infused fruit. However, these fruit were covered with thick layers of albedo that could not be removed easily. Comparisons of characteristics between solution-infused and -noninfused fruit were not made because of this qualitative difference.

Juice Loss and Firmness Studies. Juice loss was determined 0, 1, 7, 14, 21, and 28 days after peeling by the difference in the weight of the container and juice in the presence or absence of the fruit.

Figure 4A:
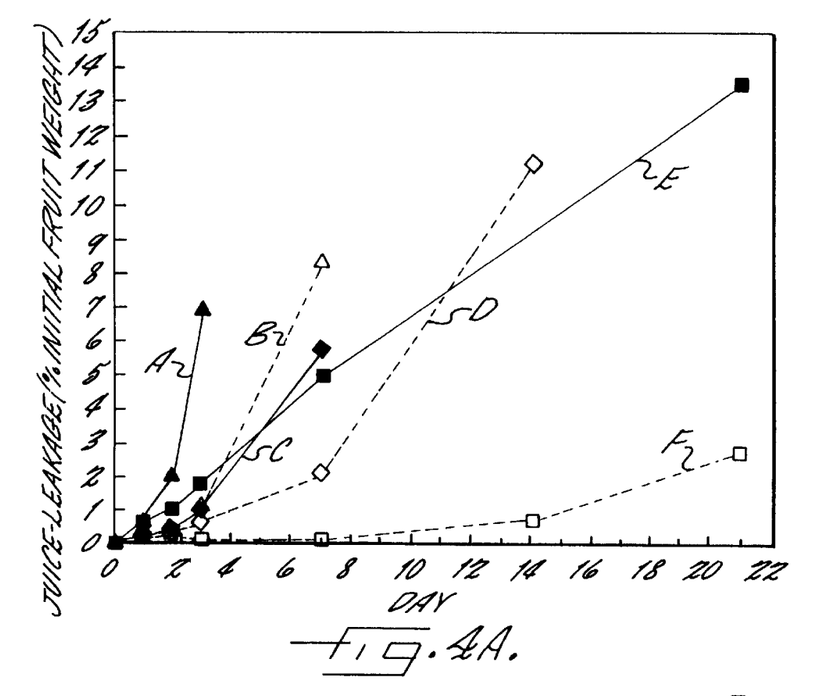
FIGS. 4A, 4B show the juice leakage of citrus fruit pretreated by water and enzyme vacuum-infusion methods during storage: (A) "Hamlin" oranges; (B) white "Marsh" grapefruit. Curve A, 15° C., enzyme; curve B, 15° C., water; curve C, 10° C., enzyme; curve D, 10° C., water; curve E, 5° C., enzyme; curve F, 5° C., water.
Figure 4B:
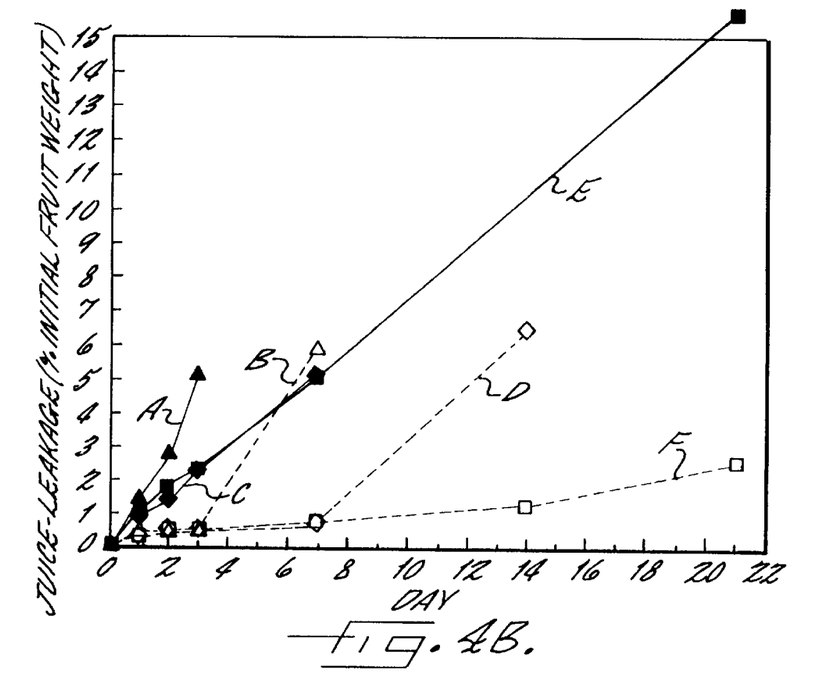

Juice loss was significantly greater for enzyme-infused fruit regardless of storage temperature (FIG. 4). Perhaps related was that firmness was perceptibly reduced even after 1 day of storage at 5° C. (Table 3). The extent of juice loss was not affected by infusion technique (data not shown).

Visual Appearance Studies. Visual appearance was assessed by triangle tests and paired comparisons to determine the appearance differential and preference, respectively, for solution compositions for fruit stored at 5° C. Visual evaluation was determined by a sensory panel of 20 judges 1 and 7 days after peeling. Fruit firmness was assessed by multiple comparison tests by a sensory panel of 9 experienced judges 1 and 7 days after peeling.

Sensory panel evaluation indicated that differences between enzyme- and water-infused fruit could be distinguished as early as 1 day after peeling (Table 4). Of those judges correctly able to differentiate the treatment difference, their preference was given to water-vacuum-infused oranges 7 days after peeling. Comments made by the judges typically reflected that the enzyme-treated fruit appeared "slimy" and thus less desirable. Other preferential comparison tests did not yield significant results.

TABLE 3

Effects of enzyme and infiltration method on firmness of peeled grapefruit and oranges.

| | | Firmness | | | |
| --- | --- | --- | --- | --- | --- |
| | | Day 1 | | Day 7 | |
| Infusion solution | Infiltration method | White grapefruit | Hamlin orange | White grapefruit | Hamlin orange |
| Enzyme[b] | Vacuum | 3.7 ± 0.2 | 4.3 ± 0.4 | 2.6 ± 0.3 | 2.4 ± 0.3 |
| Enzyme | Pressure | 3.9 ± 0.3 | 4.8 ± 0.5 | 2.3 ± 0.3 | 3.1 ± 0.4 |
| Water | Vacuum | 5.3 ± 0.2 | 4.6 ± 0.5 | 4.1 ± 0.3 | 4.0 ± 0.3 |
| Water | Pressure | 5.0 ± 0.0 | 5.0 ± 0.0 | 4.6 ± 0.3 | 4.7 ± 0.2 |

[a]Firmness was rated from 0 (firm) to 5 (soft) by sensory panel after 1 and 7 days in storage at 5 C.
[b]Fruit which were vacuum (3 kPa) or pressure (207 kPa) infused with Spark-L HPG enzyme solution were incubated at 25 C. for 1 h or 30 min, respectively. Fruit which were vacuum or pressure fused with water were peeled immediately after infusion.
[c]Average scored by nine experienced judges (±SE).

TABLE 4

Effects of enzyme treatment on the visual appearance of peeled grapefruit and orange.

| | | Day 1 | | Day 7 | |
| --- | --- | --- | --- | --- | --- |
| | | Differential[a] | Preferential[b] | Differential | Preferential |
| Hamlin | Vacuum[c] | *** | N.S. | *** | * |
| | Pressure | *** | N.S. | *** | N.S. |

TABLE 4-continued

Effects of enzyme treatment on the visual appearance of peeled grapefruit and orange.

| | | Day 1 | | Day 7 | |
| --- | --- | --- | --- | --- | --- |
| | | Differential[a] | Preferential[b] | Differential | Preferential |
| Grapefruit | Vacuum | N.S. | N.S. | * | N.S. |
| | Pressure | N.S. | N.S. | *** | N.S. |

[a]Determination of the ability to differentiate between fruit peeled by water and enzyme infusion methods (triangle test evaluation where $p \leq 0.05 = *$, $0.01 = $, and $0.001 = *$).
[b]Preferential test based of fruit peeled by water infusion preference over fruit peeled by enzyme infusion.
[c]Fruit which were vacuum (3 kPa) or pressure (207 kPa) infused with Spark-L HPG enzyme solution were incubated at 25 C. for 1 h or 30 mm, respectively. Fruit which were vacuum or pressure fused with water were peeled immediately after infusion.

Microbial Stability Studies. The microbial stability of packaged and peeled citrus was evaluated at 0, 1, 7, 14, 21, and 28 days after peeling for fruit stored at 5°, 10°, or 15° C. by known procedures. Briefly, triplicated samples of each treatment were macerated at each evaluation time. Appropriate dilutions of each sample were plated in duplicate on orange serum agar (OSA) and acidified potato dextrose agar (PDA). Plates were incubated for 48 h at 35° C. (OSA) and 5 days at 25° C. (PDA), and the number of aerobic organisms and yeasts and molds was determined.

Figure 5A:
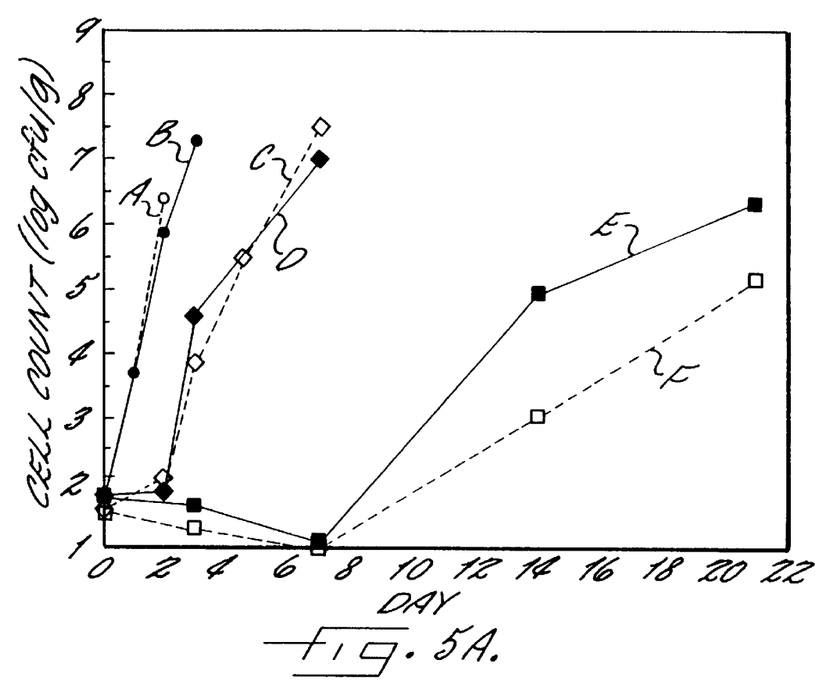
FIGS. 5A, 5B show the microbial contamination of citrus fruit peeled by water- and enzyme-vacuum-infusion methods during storage: (A) "Hamlin" oranges; (B) white "Marsh" grapefruit. Curve A, 15° C., enzyme; curve B, 15° C., water; curve C, 10° C., enzyme; curve D, 10° C., water; curve E, 5° C., water; curve F, 5° C., enzyme.
Figure 5B:
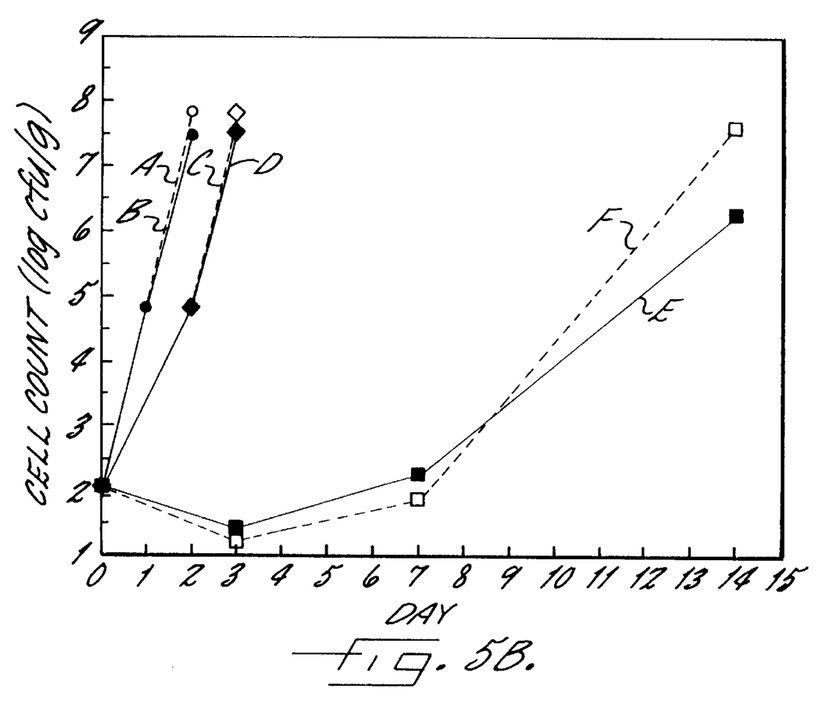

The infusion solution composition did not significantly affect microbial stability (FIG. 5). Based on the criterion that the microbial level should not exceed 5 log cfu/g of fruit, the maximum shelf life of peeled grapefruit and oranges is estimated to be about 10, 3, and 1 days for fruit stored at 5°, 10°, and 15° C. Fruit stored at 25° C. exceed this level before 1 day after storage.

Respiration-Rate Studies. The effect of solution composition on respiration rate was determined by packaging infused citrus in 25 μm low-density polyethylene, holding the fruit at 5° C., measuring steady-state $O_2$ and $CO_2$, and determining respiration rates. Gas samples (0.5 ml) were taken by syringe through a silicone septum and injected into a flow-through analysis system consisting of a Servomex 570A paramagnetic $O_2$ analyzer (Servomex, Inc., Norwood, Mass.) and an Anarad AR-400 infrared $CO_2$ analyzer (Anarad, Inc., Santa Barbara, Calif.) connected in series with a $N_2$ carrier gas.

Respiration rates for white grapefruit were 0.38 and 0.39 mmol $O_2$/kg/h for water- and enzyme-infused white grapefruit, respectively, and 1.09 and 0.90 mmol $O_2$/kg/h for water- and enzyme-infused oranges, respectively, for fruit stored at 5° C.

Ethylene Emanation Studies. Ethylene emanation was measured by sampling the package headspace and analyzing the sample with a gas chromatograph HP 5780 (Hewlett Packard, Danbury, Conn.).

Ethylene levels in the package headspace were 0.1 ppm or less for all treatments. These results suggest that while the enzyme promotes water loss, it does not stimulate a wound response. While the precise prolonged effect of enzyme on the fruit is not known, it appears the damage is slow and general. Further refinement of enzymatic peeling techniques may benefit from a determination of the precise mechanisms of fruit degradation.

In summary, then, the benefits of water infusion over enzyme infusion for pretreating citrus fruit include:

1. The fruit using water infusion are firmer, lose less juice, and have a better appearance than enzymatically peeled fruit.

2. The water-infusion method is simpler because there is no solution to prepare and monitor, no incubation period, and no temperature control necessary. The absence of the incubation time may provide additional benefits to the fruit in that the hydrated peel is likely to prevent adequate gas exchange to the flesh. Eliminating the incubation period would shorten the period of possible anaerobic respiration.

3. The water-infusion method is cheaper since there is no enzyme to purchase.

Finally, regions of dry albedo were observed after infusion, particularly when fruit had been infused by pressure or at low temperatures, had substantial internal air spaces, or had slightly desiccated peels. If the peels were not sufficiently hydrated, peeling was difficult or impossible, regardless of the presence of enzyme.

Embodiment Two

Figure 6A:
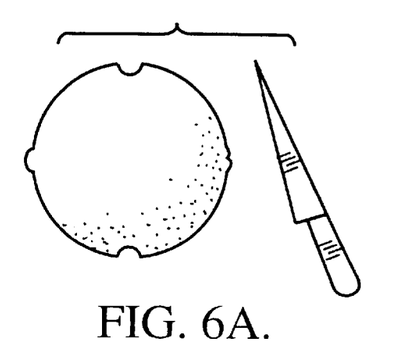
FIGS. 6A, 6B, 6C illustrate a water-infusion method of pretreating citrus fruit for peeling: (A) making holes in the fruit; (B) applying a tube to one hole; and (C) infusing the fruit with water until water escapes from the second hole.
Figure 6B:
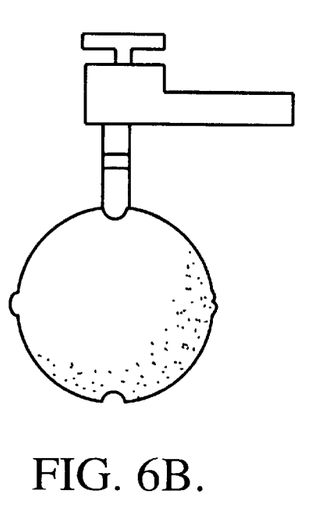
Figure 6C:
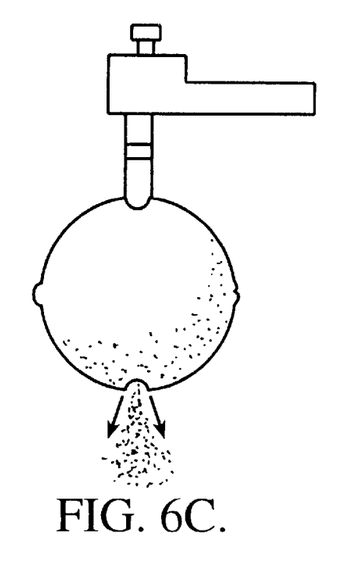

The second method for pretreating a citrus fruit for facilitating peeling, as shown in FIG. 6, comprises the steps of making a first hole 102 and a second hole 104 or cut in the cuticle 10 of the fruit 60 (FIG. 6A) and applying a tube 106 to the first hole (FIG. 6B). Preferably the tube 106 should have a radius dimensioned to closely engage the first hole 102. The fruit 60 is then infused with an aqueous solution 70 from the tube 106 at a sufficient pressure that the solution 70 is forced between the cuticle 10 and the fruit segments 30. The solution 70 hydrates the albedo 20, causes the peel 15 to expand radially, and exits from the second hole 104 or cut (FIG. 6c).

In a preferred embodiment, the first hole 102 and the second hole 104 or cut are generally radially opposed from each other, and further are positioned at an angle of generally 90 degrees away from the blossom end 40 of the fruit. Diameters of 0.5–2 cm have been found to be adequate for the first hole 102.

As can be seen in FIG. 6C, as the infusion is performed with water pressure, the water 70 passes between the peel 15 and the fruit segments 30, and typically the peel 15 of the fruit 60 is radially expanded, "ballooning out," hydrating and thereby separating the peel 15 from the fruit segments 30.

It has been found that sufficient pressure to accomplish this method can be achieved when the tube 106 extends from a water faucet 108. These pressures are generally in the range of approximately 1360 to 4080 mbar. This pressure range is exemplary and is not intended as a limitation, as water pressure varies widely from location to location.

This embodiment is beneficial with fruit 60 that typically remain dry, and also for in-home processing of fruit or for the pretreatment of fruit on an assembly line.

Embodiment Three

The third embodiment of the present invention is illustrated in FIGS. 7–11.

Plant Material. Mature Marsh white grapefruit (*Citrus paradisi* Macf.), Hamlin, pineapple, and Valencia oranges (*Citrus sinensis* L.), and Ruby Red grapefruit were obtained before washing or waxing. Fruit were stored at 5±1° C. and 95±2% relative humidity for no longer than 5 days and were washed with Fruit Cleaner 1000 (FMC, Lakeland, Fla.) prior to processing. The use of these particular citrus fruits is not intended to be a limitation on the invention.

Figures 7, 8, 9:
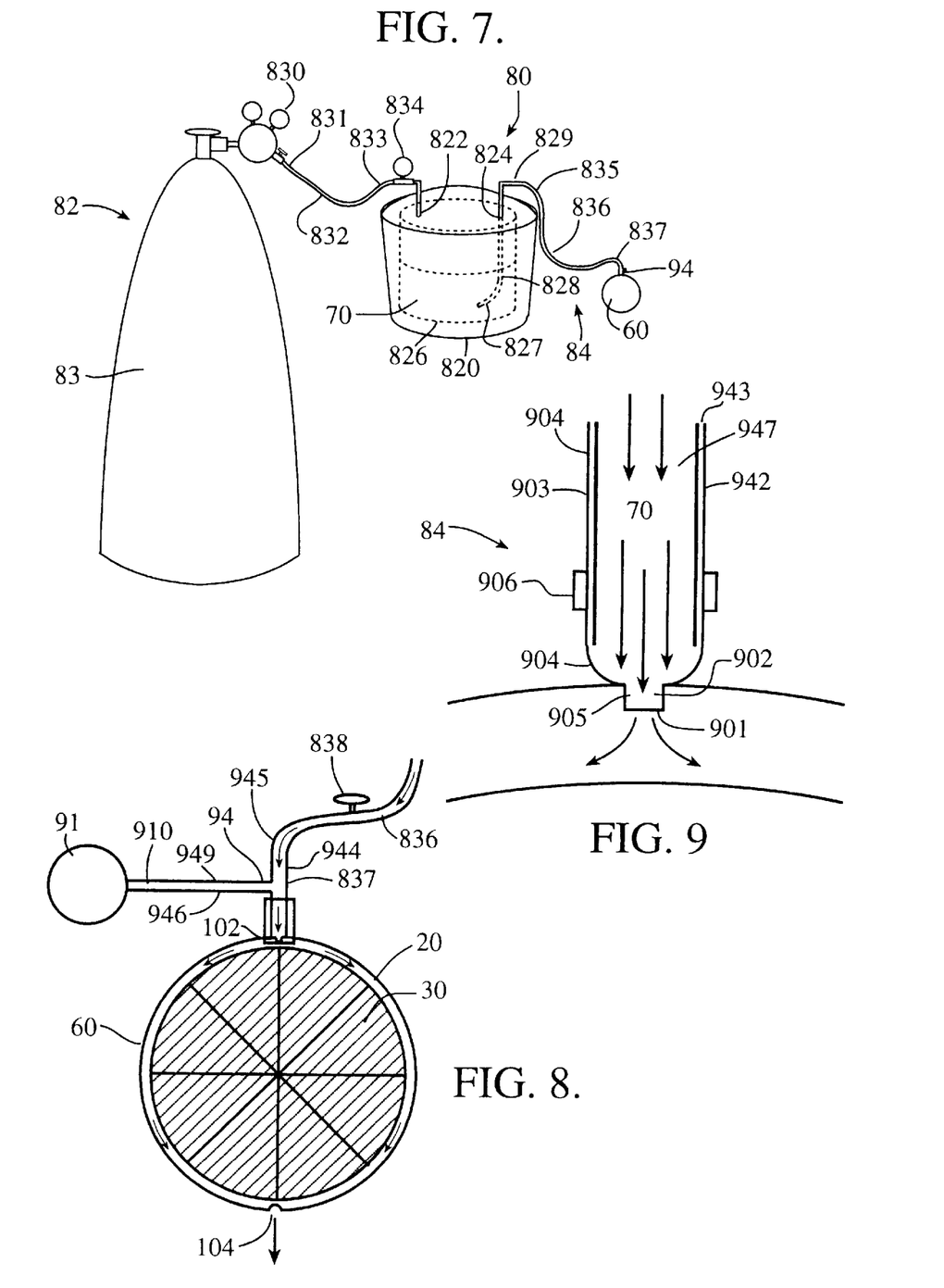
FIG. 7 is a schematic diagram of the infusion apparatus having a self-sealing nozzle.
FIG. 8 is a cross-sectional view of a citrus fruit being infused with the apparatus of FIG. 7.
FIG. 9 is a detail of FIG. 8, illustrating the nozzle-peel interface.

Injection System. The injection system 80 comprises a pressure-regulated pumping apparatus 82 and a low-pressure injection apparatus 84. The pumping apparatus 82 comprises a pressure chamber comprising a modified pressure cooker 820 having an inlet port 822 and an outlet port 824. The pumping apparatus 82 further comprises a compressed air source 83 to which is affixed a pressure regulator 830. The first end 831 of the compressed air tubing 832 is attached to the pressure regulator 830; the second end 833 is attached to the inlet port 822 of the pressure chamber 820. A 15-L container 826 is placed within the pressure cooker 820 to hold and serve as a source for infusion solution 70 (FIG. 7). A pressure gauge 834 is attached to the inlet port 822 to monitor chamber 820 pressure. In use solution 70 is forced out of the container 826 by pressure from entering compressed air from compressed air source 83.

Infusion solution tubing 828 is in fluid communication at its first end 827 with the fluid 70 within container 826, extends to the outlet port 824, and is connected at its second end 829 to the first end 835 of flexible tubing 836. A needle valve 838 along flexible tubing 836 regulates flow to the second end 837 thereof (FIGS. 8 and 9). The second end 837 of flexible tubing 836 is dimensioned to fit over and closely surround the end 945 of the second arm 944 of a T connector 94 sufficiently tightly so as to prevent fluid leakage therefrom.

The injection apparatus 84 comprises a flexible interfacing nozzle 90, which in a preferred embodiment comprises of a disposable rubber pipette bulb 903 (Fisher Scientific, Atlanta, Ga.). Bulb 903 has an orifice 901, preferably 3 mm in diameter, at a first end 902 through which solution 70 passes into the fruit 60 when in use. An open second end 904 is dimensioned to fit over and closely surround the end 943 of the first arm 942 of the T connector 94 sufficiently tightly so as to prevent fluid leakage therefrom. Fluid enters the T connector second arm 944 from flexible tubing 836, from which it passes into the T connector's lumen 947 and into the first arm 942. Fluid 70 then proceeds into the bulb first end 902, through the bulb lumen 905 to the second end 904, and out the orifice 901.

In a preferred embodiment T connector 94 comprises a 5-mm-i.d. hard plastic T connector (Cole-Parmer, Chicago, Ill., FIG. 9). Also in a preferred embodiment the bulb 903 and T-connector 94 are clamped together around an interface between the connector first arm end 943 and the bulb's second end 904 to prevent fluid leakage therebetween. A particular clamp 906 that may be used comprises a (9.25-mm-i.d. Snapper plastic hose clamp, Cole-Parmer, Chicago, Ill.) tightly together to prevent leakage (FIG. 9).

To the end 949 of the T connector's third arm 946 is connected the first end 912 of pressure sensor tubing 910, which may comprise, for example, Tygon tubing. To this tubing's second end 911 is connected a pressure sensor 91, which in a preferred embodiment comprises Li-Cor Model 610-03 (Lincoln, Nebr.). Pressure sensor 91 is for monitoring the injection pressure of fluid 70 through the orifice 901 into the fruit 60.

As can be seen, pressure is controlled by the regulator 830 on the compressed air source 83 and monitored at the inlet port 822 of the chamber 820 and by the pressure sensor 91 via the T connector 94 adjacent the nozzle 90. Pressures at the inlet port 822 and T connector are the same when flow through the orifice 901 is blocked (no-flow condition). Nozzle pressures listed in the following are based on inlet pressure unless otherwise stated. Nozzle flow rates are controlled by the needle valve 838 and calibrated by measuring the time required to fill a 1000 mL graduated cylinder. Pressure and flow rates are adjusted prior to injection.

A first hole 102 and a second hole 104 (in a particular embodiment, the holes are 5 mm in diameter and about 1–3 mm deep) are excised, for example, by a cork borer from the peel 15 at the midsection and on opposite sides of the fruit 60. The resulting notches create inlet and outlet holes for injection of solution 70. The injection process is initiated by holding the nozzle orifice 901 against the first, inlet hole 102 of the fruit. Solution 70 is pumped from the nozzle 90, through the orifice 901, into the inlet hole 102, through the albedo 20, and out the second, outlet hole 104 of the peel 15.

Internal Pressure Analysis. The pressure within the peel of a grapefruit has been monitored during the injection process. A third hole (5 mm diameter and about 3 mm deep) was cut by the cork borer into the peel 1 cm from the stem end. Tygon tubing (2 mm i.d.) was sealed into the third hole with RTV 3140 (Dow Corning Corp., Midland, Mich.) and connected to the 610-03 pressure sensor (Li-Cor, Lincoln, Nebr.). Pressure data were downloaded to a Campbell CR10 data acquisition system (Logan, Utah). Internal pressures were monitored during low-pressure (680 or 1360 mbar, 500 ml/min) injection (n=10 grapefruit/treatment). Flow rate through the fruit was determined by collecting injection solution from the outlet hole in a graduated cylinder during 10-sec intervals.

Effects of Pressure and Flow on Injection Rate. Injection of Hamlin and pineapple oranges and white and red grapefruit has been examined as a function of flow rate (250, 500, and 1000 ml/min) and nozzle pressure (340, 680, 1020, 1360, and 1700 mbar, or 5, 10, 15, 20, and 25 psi, respectively). Injection time was determined as the time required for the initial drop of solution to fall from the outlet hole (n=5 fruit/treatment). Fruit were peeled to determine the degree of hydration. Regression analysis on the effect of flow rate and nozzle pressure on injection time was performed using PlotIt ver. 3.1 (Haslett, Mich.).

Solution Uptake. Solution uptake by Valencia orange and white grapefruit during low-pressure injection or vacuum infusion has been compared. Fruit treated by the low-pressure (680 mbar, 500 ml/min) method were notched and injected with water until the initial drop of solution fell from the outlet hole. Fruit infused by the vacuum method were scored with five radial cuts from stem to blossom end and submerged in 3 L of water in a desiccator (7.5 L). A vacuum (about 3 kPa) was held for 1 min and released. Solution uptake was determined by the difference in weight before and after injection or infusion (n=10 fruit/treatment).

A dye was incorporated in the injection or infusion solution to provide a visual image of solution movement through grapefruit peel using low-pressure and vacuum methods. Fruit injected by the low-pressure method were injected (680 mbar, 500 ml/min) with methylene blue solution (0.1% w/v) until the initial drop of solution fell from the outlet hole. Fruit infused by the vacuum method were scored, submerged in a desiccator containing methylene blue solution, and infused as described above. Fruit were cut tangentially and cross-sectionally and observed (n=7 fruit/treatment).

Evaluation of the Interfacing Nozzle. The interfacing nozzle (FIGS. 8 and 9) forms a fluid-tight seal with the fruit for all nozzle pressures, solution flow rates, or fruit varieties tested. The seal was attainable due to three design features of the nozzle. First, solution pressure forced the internal wall of the bulb 903 against the fruit 60 (FIG. 9). Second, bulb flexibility allowed the nozzle to conform to the fruit surface. Third, the hardness of the T connector 94 provided structural support to the bulb 903 while the nozzle 90 was held against the fruit 60.

Evaluation of Low-Pressure Injection Methodology. Citrus peel 15 comprises an outer layer of flavedo, comprising the cuticle 10, epidermal and hypodermal cells, and oil glands, and an inner layer of albedo 20 comprising an airy network of parenchyma cells. During the process of low-pressure injection, solution passes through the inlet hole cut into the cuticle 10 and penetrates the albedo 20 (FIG. 7). The injected solution 70 displaces air within the albedo 20 and migrates through the peel 15 to the outlet hole 104, which acts as a point of least resistance. Low-pressure injection consequently inflates the entire peel 15 with solution 70 and hydrates the albedo 20.

Figure 10:
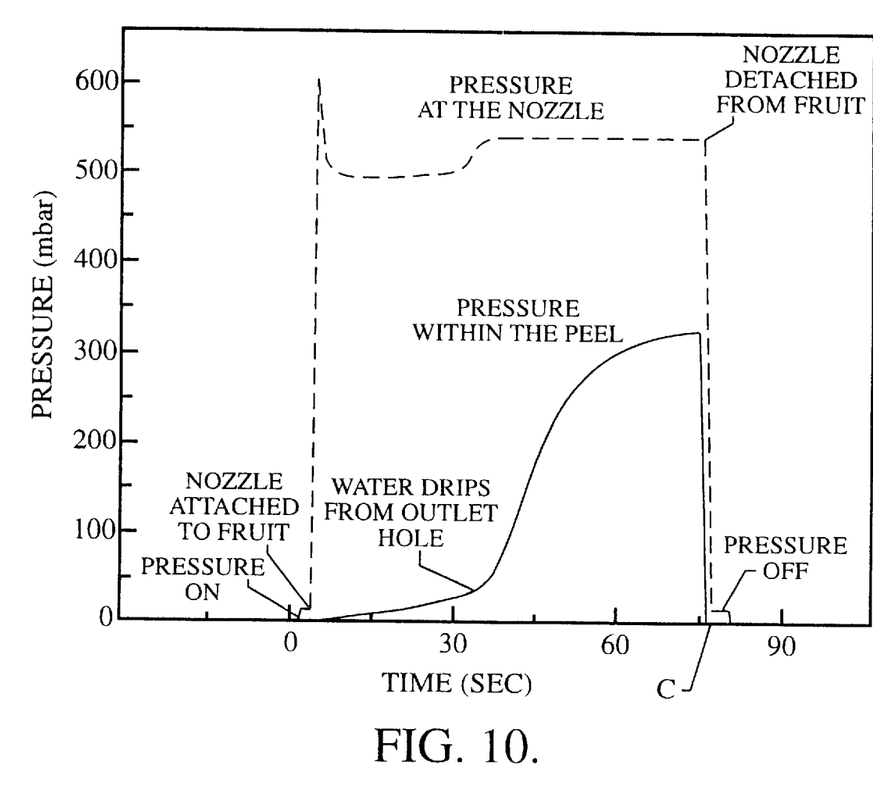
FIG. 10 illustrates an exemplary graph of pressure versus time for (broken line) nozzle pressure and (solid line) intrapeel pressure during injection. The points along the curves are as follows: A, pressure on; B, nozzle attached to fruit; C, nozzle detached from fruit; D, pressure turned off; and E, water drips from outlet hole.
Figure 11A:
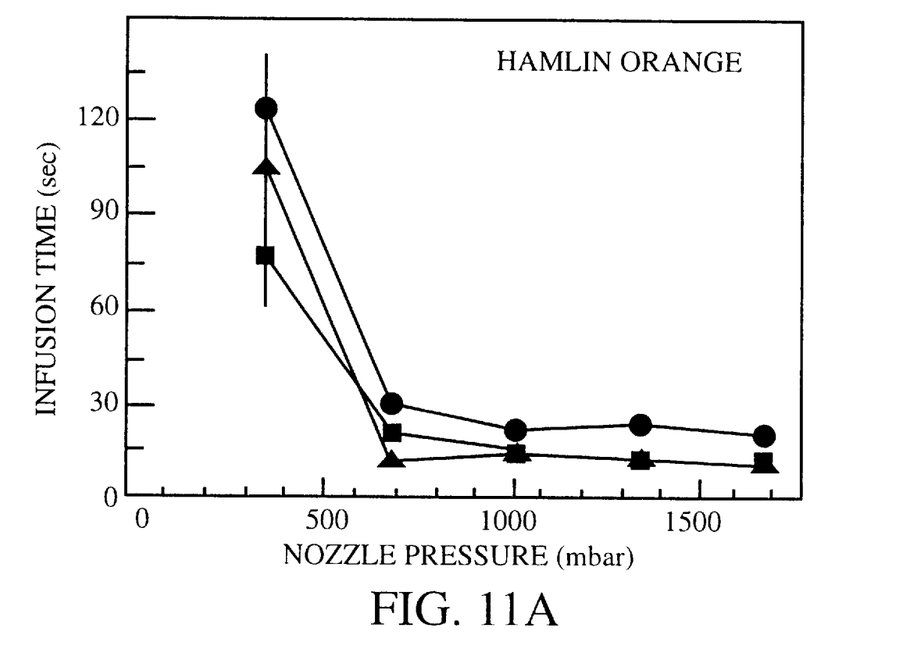
FIGS. 11A, 11B, 11C, 11D illustrate curves of infusion time versus nozzle pressure for (a) "Hamlin" orange, (b) white grapefruit, (c) pineapple orange; and (d) red grapefruit. Nozzle pressures of 340, 680, 1020, 1360, and 1700 mbar and flow rates of 250 (●), 500 (■), and 1000(▲) ml/min were tested. Bars represent SE for 5 fruit. (Bars not shown where symbol is larger than ±SE.)
Figure 11B:
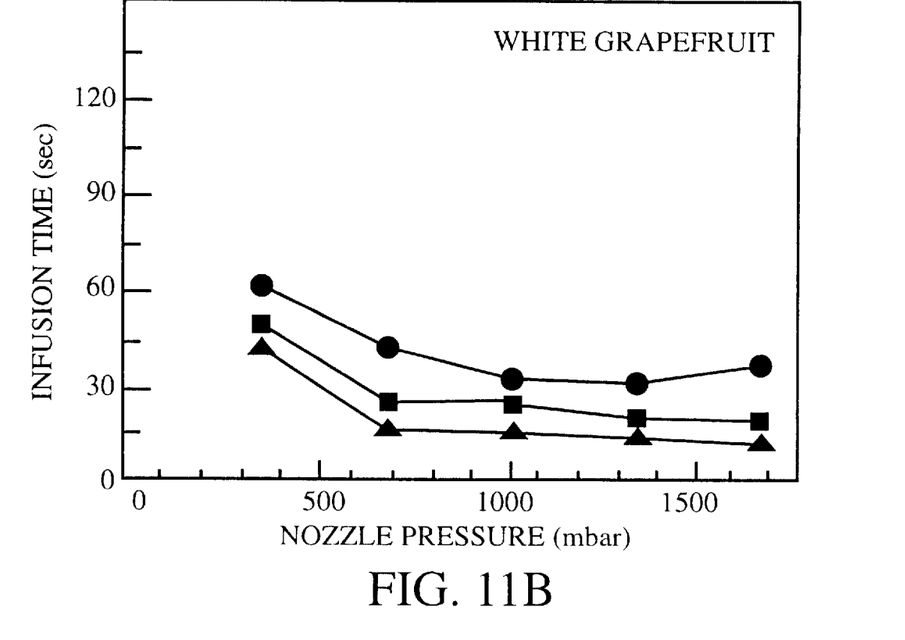
Figure 11C:
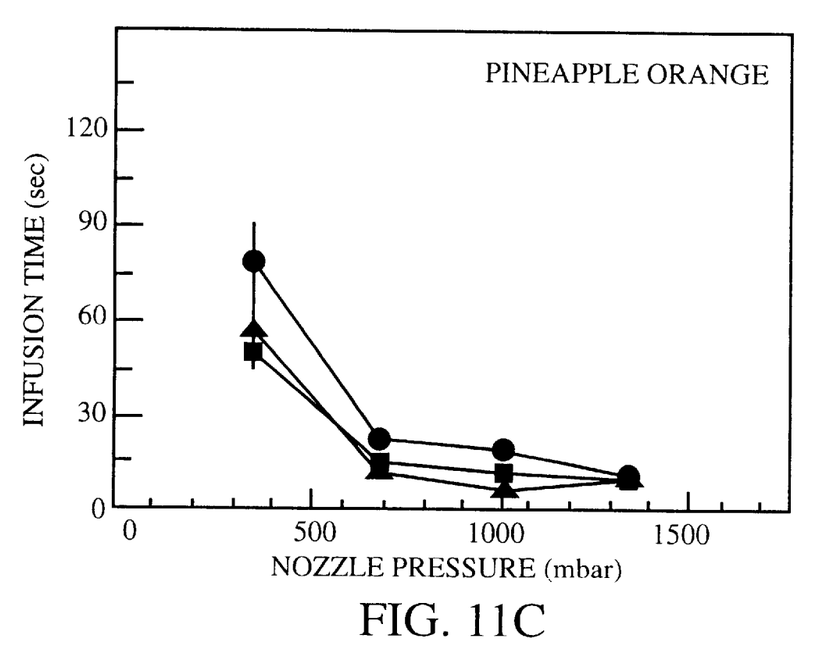
Figure 11D:
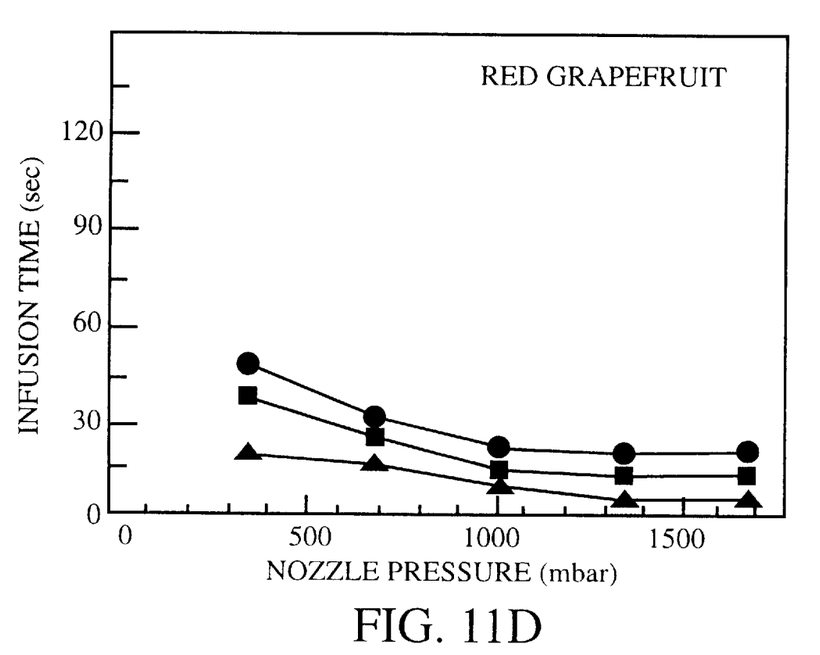

The internal peel pressure has been found to increase slowly and linearly to about 30 mbar during the saturating phase of low-pressure injection (680 mbar, 500 ml/min) of white grapefruit (FIG. 10). As the peel 15 approaches saturation, internal pressure (solid line, FIG. 10) rises rapidly and plateaus to about 300 mbar or about one-half of the nozzle pressure (broken line, FIG. 10). Flow rate through the fruit 60 during the plateau phase is about 200 ml/min. During the initial stages of injection, nozzle pressure increases immediately to about 600 mbar (cf. nozzle pressure of 680 mbar with no flow) and then relaxes to about 500 mbar. The nozzle pressure increases to about 550 mbar when the back pressure within the saturated fruit is plateauing. Nozzle and internal peel pressures return quickly to their preinjection levels when the nozzle is taken away from the fruit (point C, FIG. 10). Doubling the nozzle pressure (1360 mbar, 500 ml/min) doubles internal and nozzle pressures during injection (data not shown).

Injection time generally decreases with increasing nozzle pressure and flow rate (FIG. 11). Oranges tend to inject more rapidly than grapefruit at all but the lowest pressure (340 mbar). For example, injection times were found to be 19.8, 20.2, 22.8, and 30.8 sec for "Hamlin" (FIG. 11A) and "Pineapple" oranges (FIG. 11C) and "Marsh" white (FIG. 11B) and "Ruby Red" (FIG. 11D) grapefruit, respectively, at 680 mbar and 500 ml/min.

Low-pressure injection in some instances causes the cuticular membranes of the peel to fracture and thus prevents complete hydration of the peel. Peel rupturing does not occur at the lowest pressure (340 mbar), but becomes increasingly common when the higher flow rates and pressures are applied. "Pineapple" orange peels, which are particularly susceptible to rupturing, fractured on ten consecutive fruit at 1700 mbar and 250, 500, or 1000 ml/min. The location and time of rupturing determine the extent to which the peel can become hydrated. When rupturing occurs near the inlet hole and during the initial period of the saturation phase, injection solution migrates to the fracture, and the peel remains mostly nonhydrated. When rupturing occurs near the outlet hole and during the latter period of the saturation phase, the peel becomes nearly completely hydrated. Fruit with pre-existing puncture holes produce similar patterns of hydration.

The amount of solution injected is significantly less ($\alpha=0.01$) for low-pressure than vacuum methods. Weight was found to increase 20.8 and 32.3% after low-pressure injection and vacuum infusion, respectively, for "Valencia" orange, and 21.9 and 29.4% after low-pressure injection and vacuum infusion, respectively, for "Marsh" white grapefruit. Cross-sectional observation of grapefruit shows that the central core remained nonhydrated for the low-pressure-injected fruit, but was completely hydrated for vacuum-infused fruit.

Dye staining has been undertaken to indicate the path of solution penetration. Methylene blue is a cationic stain commonly used in plant histology to stain cell walls. Since methylene blue has a high affinity for sugar residues such as those of the albedo, it is readily sorbed from infusion solution. The intensity of staining is dependent on the proximity to the injection point and the flow of solution. The staining pattern for vacuum infusion shows intense staining near the scored regions and staining of the central core (data not shown). In comparison, dye intensity is greatest near the inlet hole while the central core is not stained for the low-pressure injected fruit. Further, the albedo near the flesh is also stained, suggesting that solution follows the surface of the flesh around the fruit. Cross-sections of white grapefruit with abnormally thick albedos (3 cm) suggest that solution completely encircles the flesh surface before the albedo of the outer peel becomes hydrated.

Application of the Interfacing Nozzle and Low-Pressure Injection Methodology. Low-pressure injection permits the injection of the peel with sterile solution since the solution does not contact the outer peel as in vacuum or pressure pulse infusion. The system permits the use of any liquid, including water or solvents or solutions containing acids, base, enzymes such as pectinase, or any other beneficial chemical. For example, citrate, which is an antimicrobial agent that also may improve peel removal, could be injected into the peel, and the fruit could be transported to market with the solution in the peel. Low-pressure injection also may be used to imbue the peel with steam to improve the peeling. Gases could be injected to fumigate the fruit or alter physiology.

Further development of low-pressure citrus injection may lead to improved efficiency and other useful devices. The method for notching the fruit could be simplified by puncturing the peel with a sharp needle that extends out and retracts into the nozzle through the orifice similar to the operation of the ink cartridge in a ball point pen. A multiple-injector system may decrease injection time and reduce the likelihood of peel fracture. Low-pressure injection may be developed to assess the quality of the peel of an intact fruit. Rates of injection and incidences of fracture may be useful indices in assessing peel strength, maturity, and susceptibility to peel disorders that shorten the shelf life of nonpeeled citrus.

The low-pressure injection method described herein provides a safe, simple, and effective method for imbuing citrus peel. Since infusion of water enhances peel removal, tap water can be used as the injection solution. The force of water from a conventional faucet is sufficient to inject the fruit. Therefore, electrical pumps or vacuum or pressure chambers are not required. The interfacing nozzle is simple in construction and can be produced inexpensively, thus making the development of a low-pressure injection system for the home or small business possible. Finally, the injection method can be adapted for continuous processing on an industrial scale.

It may be appreciated by one skilled in the art that additional embodiments may be contemplated, including the use of this method for other fruits and vegetables.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for pretreating a citrus fruit for facilitating peeling, the fruit having fruit segments surrounded by a peel comprising a cuticle and an albedo on an inside of the cuticle, the method comprising the steps of:

making a first and a second hole in the cuticle of the fruit;

applying a tube to the first hole, the tube having a radius dimensioned to closely engage the first hole; and infusing the fruit with a water solution from the tube at a sufficient pressure that the solution is forced between the cuticle and the fruit segments, hydrating the albedo and causing the peel to expand radially, and exits from the second hole, the hydrated albedo facilitating a separation of the peel from the fruit segments.

2. The method recited in claim 1, wherein the first and the second hole are generally radially opposed from each other.

3. The method recited in claim 2, wherein the first and the second hole are each positioned at an angle of approximately 90 degrees away from a blossom end of the fruit.

4. The method recited in claim 1, wherein the tube comprises a tube extending from a water faucet.

5. The method recited in claim 1, wherein the first and the second hole have diameters generally in a range of approximately 0.5 to 2 cm.

6. A method for pretreating a citrus fruit for facilitating peeling, the fruit having fruit segments surrounded by a peel comprising a cuticle and an albedo on an inside of the cuticle, the method comprising the steps of:

making a first and a second hole in the cuticle of the fruit;

applying a nozzle to the first hole, the nozzle having an orifice at a first end having a radius smaller than the first hole and a tube affixed to a second end; and infusing the fruit with a water solution passing through the tube and the nozzle orifice at a sufficient pressure to press the nozzle first end against the first hole and to force solution between the cuticle and the fruit segments, hydrating the albedo and causing the peel to expand radially, the solution exiting from the second hole, the hydrated albedo facilitating a separation of the peel from the fruit segments.

7. The method recited in claim 6, further comprising the step, prior to the infusing step, of clamping the nozzle second end and the tube together to prevent solution leaking from an interface therebetween.

8. The method recited in claim 6, wherein the infusing step further comprises of controlling the pressure in order to prevent a rupturing of the peel.

9. The method recited in claim 8, wherein the pressure-controlling step comprises applying the solution with a pressure at the nozzle orifice in the range of approximately 300–1800 mbar.

10. The method recited in claim 6, wherein the infusing step comprises controlling a flow rate of the solution through the nozzle orifice with the use of a valve positioned upstream of the nozzle orifice.

11. The method recited in claim 10, wherein the flow-rate-controlling step comprises controlling the flow rate to within a range of approximately 250–1000 ml/min.

12. The method recited in claim 6, wherein the infusing step comprises controlling an infusion time.

13. The method recited in claim 12, wherein the controlling step comprises injecting the solution for a period in the range of approximately 15–120 sec.

14. A method for preparing for peeling a citrus fruit having a nonslip skin, each of which has an inner body of adjacent fruit segments and a peel surrounding the body of fruit segments having an outer cuticle and an inner albedo layer between the cuticle and the body of segments, the peel and the fruit segments closely opposed, the method comprising the steps of:

forming plural opposed openings in the peel;

infusing water between the peel and the body of fruit segments through the opposed openings, the water being free of any enzymes or other active ingredients in sufficient amounts to chemically attack the cuticle, albedo, or fruit segments; and applying a pressure differential to the infused water relative to pressure exterior of the peel, the pressure differential at a sufficient level to radially expand the peel and separate the peel from the body of fruit.

15. The method recited in claim 14, wherein the citrus fruit is selected from the group consisting of oranges, grapefruits, limes, lemons, uglifruits, Temple oranges, and tangelos.

* * * * *